(12) United States Patent
Isobe et al.

(10) Patent No.: US 6,695,284 B2
(45) Date of Patent: Feb. 24, 2004

(54) ELECTROMAGNETIC VALVE APPARATUS

(75) Inventors: Eiji Isobe, Kariya (JP); Isao Hattori, London (GB)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/265,445

(22) Filed: Oct. 7, 2002

(65) Prior Publication Data

US 2003/0075702 A1 Apr. 24, 2003

(30) Foreign Application Priority Data

Oct. 23, 2001  (JP) ........................................ 2001-324993

(51) Int. Cl.$^7$ .............................................. F16K 31/02
(52) U.S. Cl. ............................... 251/129.15; 251/129.22
(58) Field of Search ....................... 251/129.01–129.22

(56) References Cited

U.S. PATENT DOCUMENTS

| | | | | |
|---|---|---|---|---|
| 4,637,554 A | * | 1/1987 | Takeda ................... | 251/129.15 |
| 5,193,494 A | * | 3/1993 | Sono et al. .............. | 123/90.12 |
| 5,599,003 A | * | 2/1997 | Seemann et al. ........ | 251/129.2 |
| 5,769,391 A | | 6/1998 | Noller et al. ........... | 251/129.21 |
| 6,062,824 A | * | 5/2000 | Kimura et al. ......... | 251/129.15 |
| 6,146,106 A | * | 11/2000 | Suitou et al. .......... | 251/129.18 |

OTHER PUBLICATIONS

US 09/684,906; Hattori et al.; Oct. 10, 2000; "Electromagnetic Valve".

* cited by examiner

*Primary Examiner*—Paul J. Hirsch
(74) *Attorney, Agent, or Firm*—Nixon & Vanderhye P.C.

(57) ABSTRACT

An electromagnetic valve apparatus prevents fluid leakage and contains a stationary core having a shape of a bottomed, single-piece cup constructed by combining a housing portion, an attracting portion, a thin-walled portion that joins the housing portion and the attracting portion, and a flange portion. The housing portion has a closed bottom portion, and the attracting portion is adjacent an open end of the stationary core. The housing portion reciprocally supports a movable core. The thin-walled portion is a magnetic resistance portion for preventing leakage of magnetic flux. A magnetic cylindrical attracting member is press-inserted in the inner wall of the attracting portion located on the opened side of the stationary core. The attracting member is arranged face to face with the movable core in the reciprocating path of the movable core. Upon energizing a coil, a magnetic attractive force attracts the movable core to the attracting member.

10 Claims, 2 Drawing Sheets

ELECTROMAGNETIC VALVE APPARATUS

CROSS REFERENCE TO RELATED APPLICATION

This application is based upon, claims the benefit of priority of, and incorporates by reference the contents of prior Japanese Patent Application No. 2001-324993 filed on Oct. 23, 2001.

BACKGROUND OF THE INVENTION

1. Field of the Invention

The present invention relates to an electromagnetic valve apparatus that generates a magnetic attractive force between a stationary core and a movable core. The electromagnetic valve controls a flow rate in a flow passage by means of a valve member which is driven to concurrently reciprocate with the movable core.

2. Description of the Related Art

Generally, it is known that an electromagnetic valve apparatus has a stationary core constructed of a housing portion and an attracting portion that are provided independently of each other. The housing portion accommodates a movable core so that the movable core can reciprocate, and so that the attracting portion can attract the movable core in one of the reciprocating directions. With this construction, there is a possibility that the axes of the housing and attracting portions may deviate from each other due to assembly errors or other reasons. To prevent interference with the reciprocating motion of the movable core due to the axial deviation between the housing and attracting portions, an air gap formed between the housing portion and the movable core, as well as that formed between the attracting portion and the movable core in the radial direction, is made large in consideration of the axial deviation. Increasing the size of the air gap entails a decrease in magnetic attractive force for attracting the movable core to the attracting portion. Therefore, a larger number of coil windings is required to obtain a magnetic attractive force of a desired level. Increasing the number of coil windings, however, requires that the electromagnetic valve apparatus have an unduly large actuator.

An electromagnetic valve apparatus disclosed in Japanese National Publication No. Hei. 11-500509 succeeds in preventing an axial deviation between an attracting portion and a housing portion by forming the attracting and housing portions of a stationary core in one piece. To attract the movable core toward one of its reciprocating directions, the attracting portion has a portion formed so as to face the movable core, i.e., a portion formed so as to be located on an inner peripheral side thereof relative to an inner wall of the housing portion. In the case of forming the attracting and housing portions integrally with each other, one end of the housing portion opposite to the attracting portion opens for convenience in processing.

However, when a valve member, which reciprocates concurrently with the movable core, is driven to control a flow rate of fluid flowing through a flow passage, there is a possibility that fluid will leak from the valve member to the movable core location. To prevent fluid leaking from the valve member to the movable core from escaping outside of the electromagnetic valve apparatus, the opening of the housing portion needs to be sealed with an additionally provided member.

SUMMARY OF THE INVENTION

It is therefore an object of the present invention to provide an electromagnetic valve apparatus in which leakage of fluid can be prevented by using a simple structure. Another object of the present invention is to provide an electromagnetic valve apparatus that is capable of maintaining a smooth reciprocating motion of its movable core.

According to the first to fourth aspects of the present invention, the electromagnetic valve apparatus is configured such that the stationary core, which accommodates the reciprocal movable core, is formed in the shape of a cup having a bottom. This eliminates the need to prepare a sealing member for preventing fluid, which may leak from the valve member to the movable core, from leaking out of the stationary core.

Moreover, the stationary core has, on its inner wall located on the opened side relative to the movable core, an attracting member placed face to face with the movable core along the reciprocating direction (path), so that a magnetic attractive force is exerted between the attracting member and the movable core. This makes it possible to secure an adequate magnetic attractive force for attracting the movable core.

According to the second aspect of the invention, the electromagnetic valve apparatus is configured such that, on the open side of the housing portion for accommodating the reciprocally movable core, a concavity is formed that is larger than the housing portion, in inner diameter, and receives therein the attracting member. The attracting member is retained by the stepped portion formed on the housing portion side of the concavity. This facilitates positioning for placing the attracting member in the stationary core.

According to the third aspect of the invention, the electromagnetic valve apparatus is configured such that, at least in one of the reciprocating directions of the movable core, a concavity for holding foreign matter is formed on the inner wall of the stationary core but located in a region outside of the range of the reciprocating motion of the movable core. Alternatively, the concavity may be formed between the inner wall of the stationary core and the outer wall of the attracting member. Foreign matter in the fluid will become trapped in the concavity and will not interfere with the sliding surfaces between the movable core and the stationary core. Therefore, the movable core will reciprocate smoothly.

According to a fifth aspect of the invention, the electromagnetic valve apparatus supplies a working fluid to a valve timing adjustment apparatus, or performs switching of a flow passage for discharging the working fluid out of the valve timing adjustment apparatus. In this case, since the stationary core exterior portion of the electromagnetic valve apparatus is surrounded by the atmosphere, it is necessary to prevent the working fluid from leaking outside of the electromagnetic valve apparatus. Therefore, by employing the electromagnetic valve apparatus embodying the present invention, the leakage of fluid to the outside of the electromagnetic valve apparatus can be prevented in a simple structure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Hereinafter, preferred embodiments of the present invention will be described with reference to the accompanying drawings.

First Embodiment

Figure 1:
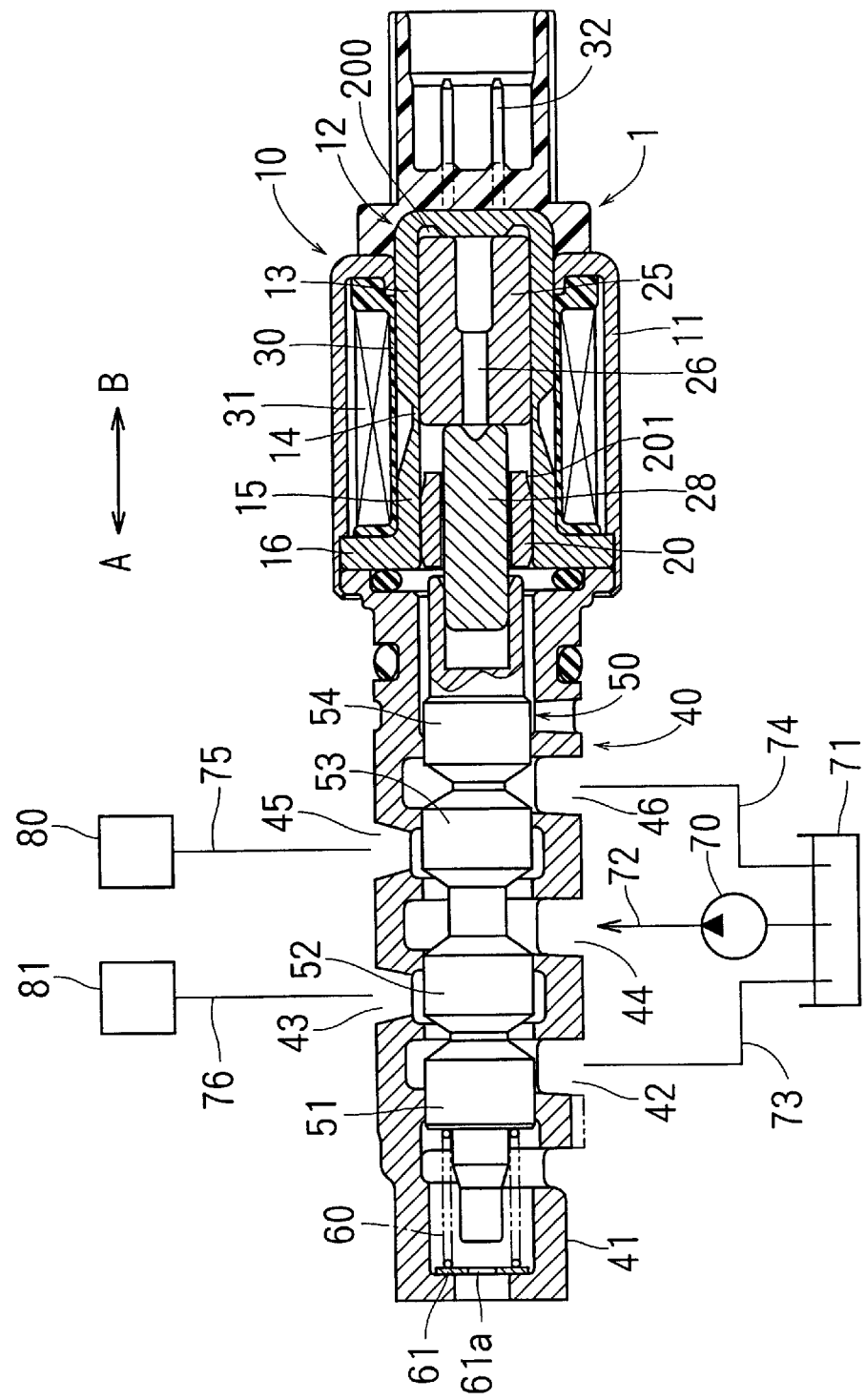
FIG. 1 is a cross-sectional view showing a hydraulic control valve in accordance with a first embodiment of the present invention.

FIG. 1 shows a first embodiment realized by applying an electromagnetic valve apparatus embodying the present invention to a hydraulic control valve of a valve timing adjustment apparatus incorporated in an internal combustion engine. FIG. 1 illustrates a state in which no electric current is applied to an electromagnetic actuator 10. In FIG. 1, arrows A and B each indicate a direction in which a movable core 25 reciprocates.

A hydraulic control valve 1 is composed of the electromagnetic actuator 10 for generating a magnetic attractive force through application of electric current, and a spool control valve 40 formed as a valve portion. A yoke 11 of the electromagnetic actuator 10 and a sleeve 41, serving as a housing for the spool control valve 40, are fixed to each other by caulking. By reciprocation of movable core 25 and spool 50 formed as a valve member, the spool control valve 40 serves to adjust the amount of working fluid supplied to a retard side hydraulic chamber 80 and an advance side hydraulic chamber 81, and also the amount of working fluid discharged from the retard side hydraulic chamber 80 and the advance side hydraulic chamber 81.

The electromagnetic actuator 10 includes the yoke 11, a stationary core 12, a movable core 25, a bobbin 30, and a coil 31 wound on the bobbin 30. The yoke 11 and the stationary core 12 constitute a stator. A flange portion 16 of the stationary core 12 is gripped between the yoke 11 and the sleeve 41. The yoke 11, the stationary core 12, and the movable core 25 are made of a magnetic material and provide a magnetic circuit.

The single-piece, cup-shaped, stationary core 12 is constructed by combining a housing portion 13, an attracting portion 15, a thin-walled portion 14 for joining together the housing portion 13 and the attracting portion 15, and a flange portion 16. The housing portion 13 has a closed end, and the attracting portion 15 has an open end. The thin-walled portion 14 serves as a magnetic resistance portion for preventing leakage of magnetic flux from occurring between the housing portion 13 and the attracting portion 15.

The housing portion 13 supports the movable core 25 in such a way to permit the movable core 25 to reciprocate. To make a clearance exist between the housing portion and the outer peripheral wall of the movable core 25 as small as possible to increase the magnetic attractive force, at least one of the inner peripheral wall of the housing portion 13 and the outer peripheral wall of the movable core 25 is plated with a non-magnetic material such as composition of nickel and phosphorus.

The housing portion 13 and the attracting portion 15 have identically sized inside diameters. An attracting member 20, formed of a magnetic material in a cylindrical shape, is press-inserted against the inner wall of the attracting portion 15 at the open end of the stationary core 12. The attracting member 20 is arranged face to face with the movable core 25 in the reciprocating path of the movable core 25. Upon application of current to the coil 31, a magnetic attractive force is generated between the attracting member 20 and the movable core 25 in a direction indicated by the arrow A shown in FIG. 1, thereby attracting the movable core 25.

Figure 2:
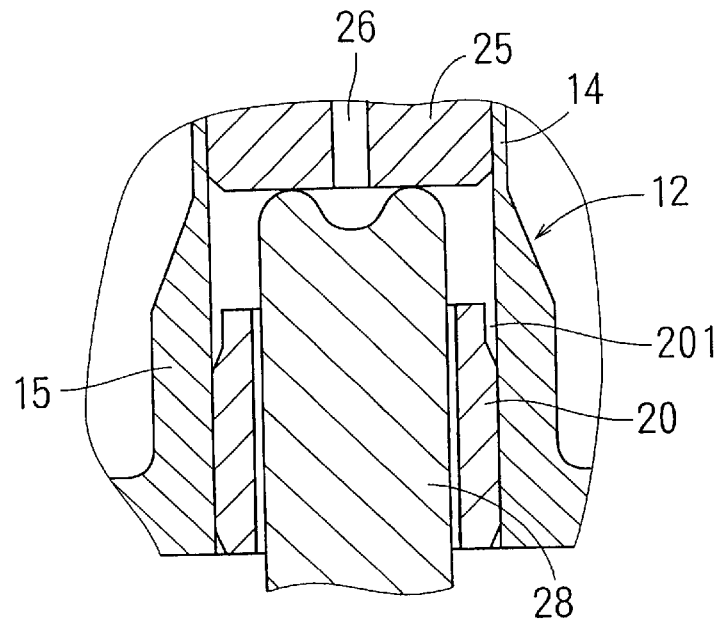
FIG. 2 is a cross-sectional view showing the periphery of the housing member employed in the first embodiment.

On the inside wall of the housing portion 13 located on one side of the movable core 25 along the reciprocating path, an annular concavity 200 is formed. The end of the housing portion 13 containing the annular concavity 200 is referred to as the bottom. On the outer wall of the attracting member 20 located on the other side of the movable core 25 along the reciprocating path, an annular concavity 201 (refer to FIG. 2) is formed. The concavities 200 and 201 are each located at a position falling outside the reciprocating motion range of the movable core 25. Formed around the shaft center of the movable core 25 is a relieving passage 26 for providing communication between the gaps secured on the opposite sides of the movable core 25 along (in line with) the reciprocating path. This arrangement allows the movable core 25 to reciprocate without suffering from interference. A shaft 28 has a first end abutting the movable core 25, and has its other, second end, press-inserted in the spool 50.

The coil 31 has its winding end connected to a terminal 32 which supplies controlling current to the coil 31. Upon application of controlling current to the coil 31, the movable core 25 is attracted toward the attracting member 20 against a thrusting force exerted by a spring 60 abutting the spool 50. The thrusting force of the spring 60 acts in the arrow B direction shown in FIG. 1, i.e., one of the reciprocating directions of the movable core 25, whereas the magnetic force generated by application of electric current to the coil 31 acts in such a way that the movable core 25 is attracted toward the arrow A direction shown in FIG. 1, i.e., the other of the reciprocating directions of the movable core 25.

The spool control valve 40 includes the sleeve 41 and the spool 50. The sleeve 41 has, in several predetermined positions on its peripheral wall, a plurality of through holes 42, 43, 44, 45, 46, each acting as a flow passage through which working fluid passes. A pump 70 serves to feed working fluid drawn from an oil tank 71 to the through hole 44 as indicated by path arrow 72. The through holes 42 and 46 are opened toward the oil tank 71 through oil passages 73 and 74, respectively. The through hole 43 communicates with the advance side hydraulic chamber 81 through an oil passage 76, whereas the through hole 45 communicates with the retard side hydraulic chamber 80 through an oil passage 75.

The spool 50 is supported on the inner wall of the sleeve 41 and slides in its axial direction. The spool 50 is composed of large diameter portions 51, 52, 53, 54, and alternately therewith, smaller diameter portions, that are arranged along the reciprocating directional path. The larger diameter portion has a diameter which is substantially the same as the inside diameter of the sleeve 41, and acts as a land portion sliding on the inner wall of the sleeve 41.

The spring 60 has a first end abutting one end face of the spool 50 opposite to the movable core 25, and has its other end abutting against a plate 61. The spring 60 loads the spool 50 with a force that tends to urge it in the direction of arrow B as shown in FIG. 1. The plate 61, formed as an annular thin plate, has a through hole 61a formed in its central part.

Next, operation of the hydraulic control valve 1 will be described.

(1) FIG. 1 illustrates a state in which no electric current is applied to the coil 31. In this state, no magnetic attractive force is exerted on the movable core 25, and the movable core 25, the shaft 28, and the spool 50 are located in their positions as shown in FIG. 1 under the thrusting force of the spring 60. At this time, in the spool control valve 40, through holes 44, 45 are brought into communication with each other, and communication between the through holes 43, 44, and that between the through holes 45, 46 is terminated. Thereby, working fluid is supplied from the pump 70, through the through holes 44, 45, and the oil passage 75, to the retard side hydraulic chamber 80. Simultaneously, through holes 42, 43 are brought into communication with each other, and consequently the working fluid contained in the advance side hydraulic chamber 81 is discharged into the oil tank 71.

(2) Upon application of controlling current to the coil 31, the movable core 25 is attracted in the direction of arrow A as shown in FIG. 1, i.e., attracted toward the attracting member 20, against the thrusting force of the spring 60. The spool 50 is moved, concurrently with the movable core 25 and the shaft 28, in the arrow A direction as shown in FIG. 1, and is then retained by the plate 61. Whereupon, in the spool control valve 40, the through holes 43, 44 are brought into communication with each other, and communication between the through holes 45, 44 and that between the through holes 43, 42 is terminated. Thereby, working fluid is supplied from the pump 70, through the through holes 44, 43, and the oil passage 76, to the advance side hydraulic chamber 81. Simultaneously, the through holes 45 and 46 are brought into communication with each other, and consequently the working fluid contained in the retard side hydraulic chamber 80 is discharged into the oil tank 71.

The position of the spool 50 is determined in accordance with a balance between the magnetic attractive force acting on the movable core 25 and a thrusting force exerted by the spring 60. Since the value of electric current to be applied to the coil 31 is proportional to the magnetic force generated, by controlling the value of electric current to be applied to the coil 31, the position of the spool 50 can be linearly controlled. Hence, the amount of working fluid supplied to the retard side hydraulic chamber 80 and the advance side hydraulic chamber 81, as well as the amount of working fluid discharged from both of the hydraulic chambers, can be adjusted in accordance with the position of the spool 50.

In the first embodiment, since the stationary core 12 is formed in the shape of a bottomed cup, the housing portion 13, which accommodates the movable core 25 so that it is reciprocally movable, has a first end adjacent to the movable core 25 that is enclosed and thus, entry of the working fluid having leaked from the spool 50 to the movable core 25 can successfully be blocked by the enclosed end of the housing portion 13. This eliminates the need to seal the end of the housing portion 13 opposite to the spool 50.

In the first embodiment, the stationary core 12 is formed in the shape of a bottomed cup. This makes it difficult to form, on the attracting portion 15 located on the opened end of the stationary core 12, a portion that is smaller than the housing portion 13 with respect to an inside diameter and placed face to face with the movable core 25 along the reciprocating path. In the attracting portion 15 thus constructed, a magnetic attractive force acting between the attracting portion 15 and the movable core 25 is lessened. In order for a magnetic attractive force of a desired level to be generated between the movable core 25 and the attracting portion 15, the number of windings of the coil 31 need to be increased. In this connection, in the first embodiment, the attracting member 20 is press-inserted against the inner wall of the attracting portion 15 located adjacent to the opened end of the stationary core 12, so as to face the movable core 25 along the reciprocating path, that is, the A-B direction.

This makes it possible to secure an adequate magnetic force to attract the movable core 25, without increasing the number of coil windings.

Occasionally, foreign matter will find its way into the working fluid of the electromagnetic actuator 10. The foreign matter may possibly enter a sliding portion between the movable core 25 and the housing portion 13. Intrusion of foreign matter into the sliding portion interferes with the reciprocating motion of the movable core 25. This results in non-smooth movement between the core 25 and the housing portion 13. In some cases, as the movable core 25 starts to reciprocate, the foreign matter, having entered the sliding portion between the movable core 25 and the housing portion 13, is scraped away by the reciprocating motion. However, the scraped foreign matter may again enter the sliding portion between the movable core 25 and the housing portion 13.

In the first embodiment, the concavities 200 and 201 are each formed in a position located outside the range of the reciprocating motion of the movable core 25. Therefore, foreign matter contained in working fluid, or that scraped away from the sliding portion between the movable core 25 and the housing portion 13 remains in the concavities 200 and 201, and thus no longer enters the sliding portion between the movable core 25 and the housing portion 13. This permits the movable core 25 to reciprocate smoothly. The foreign matter will remain in the concavities 200 and 201 along with an amount of working fluid.

Second Embodiment

Figure 3:
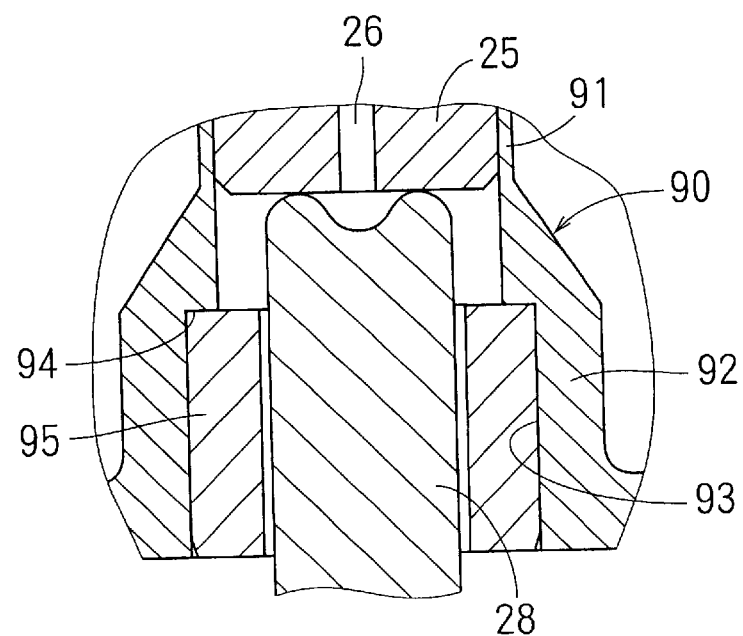
FIG. 3 is a cross-sectional view showing the periphery of the housing member employed in a second embodiment.

FIG. 3 shows a second embodiment of the present invention. Components that play the same or corresponding roles as in the first embodiment are identified with the same reference symbols. Therefore, overlapping descriptions will be omitted.

A stationary core 90 is, like the stationary core 12 of the first embodiment, formed in the shape of a bottomed cup. A thin-walled portion 91 is a magnetic resistance portion for joining together a housing portion (not shown) and an attracting portion 92. In the attracting portion 92 is formed a concavity 93 having a diameter larger than the inside diameter of the housing portion. Formed on the housing portion side of the concavity 93 is a stepped portion 94. An attracting member 95, which is formed of a magnetic material in a cylindrical shape, is press-inserted in the concavity 93 until it is retained by the stepped portion 94. Since the attracting member 95 remains press-inserted until it is retained by the stepped portion 94, positioning for mounting the attracting member 95 can be readily achieved.

The above-described embodiments of the present invention pertain to cases where the electromagnetic valve apparatus is employed as a hydraulic control valve of a valve timing adjustment apparatus. However, the electromagnetic valve apparatus embodying the present invention may be used for any application that requires control of a fluid flow rate through a flow passage and prevention of fluid leakage. Therefore, the description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electromagnetic valve apparatus comprising:
   a movable core;
   a single-piece stationary core having a first end as a closed end and a second end defining an opening, wherein the stationary core accommodates and reciprocally supports the movable core;

an attracting member attached to an inner wall of the stationary core, wherein the inner wall is located adjacent to the open end of the stationary core, the attracting member being placed face to face with the movable core in a path in which the movable core reciprocates, with a magnetic attractive force being generated between the attracting member and the movable core;

a coil disposed around an outer periphery of the stationary core, the coil generating a magnetic attractive force between the attracting member and the movable core; and a valve member disposed adjacent to the attracting member of the movable core, wherein the valve member reciprocates with the movable core to control a flow rate in a flow passage.

2. The electromagnetic valve apparatus according to claim 1, wherein the stationary core defines, for accommodating the movable core to be reciprocally movable, a concavity larger than a housing portion in inner diameter, for receiving therein the attracting member, and the attracting member is retained by a stepped portion formed on the housing portion side of the concavity.

3. The electromagnetic valve apparatus according to claim 1, wherein a concavity exists on an inner wall of the stationary core and located in a region falling outside a range of reciprocating motion of the movable core, or formed in between the inner wall of the stationary core and an outer wall of the attracting member.

4. The electromagnetic valve apparatus according to claim 2, wherein a concavity exists on an inner wall of the stationary core and located in a region falling outside a range of reciprocating motion of the movable core, or formed in between the inner wall of the stationary core and an outer wall of the attracting member.

5. The electromagnetic valve apparatus according to claim 1, wherein a concavity exists between an inner wall of the stationary core and an outer wall of the attracting member.

6. The electromagnetic valve apparatus according to claim 2, wherein a concavity exists between an inner wall of the stationary core and an outer wall of the attracting member.

7. The electromagnetic valve apparatus according to claim 1, further comprising:

a tubular housing for accommodating the valve member in such a way that the valve member is reciprocally movable, the tubular housing having a plurality of through holes that penetrate its peripheral wall, wherein the valve member is composed of larger diameter portions sliding on an inner wall of the housing, and alternately therewith, smaller diameter portions which are smaller in diameter than the larger diameter portions, and arranged along the reciprocating path, and switching between communication and discommunication among the through holes occurs according to a reciprocating position of the valve member.

8. The electromagnetic valve apparatus according to claim 6, further comprising:

a tubular housing for accommodating the valve member in such a way that the valve member is reciprocally movable, the tubular housing having a plurality of through holes that penetrate its peripheral wall, wherein the valve member is composed of larger diameter portions sliding on an inner wall of the housing, and alternately therewith, smaller diameter portions which are smaller in diameter than the larger diameter portions, and arranged along the reciprocating path, and switching between communication and discommunication among the through holes occurs according to a reciprocating position of the valve member.

9. The electromagnetic valve apparatus according to claim 8, wherein the electromagnetic valve apparatus supplies working fluid to a valve timing adjustment apparatus, or performs switching of a flow passage for discharging the working fluid out of the valve timing adjustment apparatus, the valve timing adjustment apparatus being incorporated in a power train, provided in an internal combustion engine, for transmitting a driving force from a driving shaft to a driven shaft that drives at least one of an intake valve and an exhaust valve to open or close, so as to control timings of opening and closing movements of at least one of the intake valve and the exhaust valve in accordance with fluid pressure.

10. The electromagnetic valve apparatus according to claim 1, wherein the stationary core is comprised of a housing portion, an attracting portion, and a thin-walled portion connecting the housing portion and the attracting portion.

* * * * *